(12) United States Patent
Borrel

(10) Patent No.: US 8,784,208 B2
(45) Date of Patent: Jul. 22, 2014

(54) GAME CONTROL THUMB GRIP

(76) Inventor: Jeffrey Todd Borrel, Pasadena, CA (US)

(*) Notice: Subject to any disclaimer, the term of this patent is extended or adjusted under 35 U.S.C. 154(b) by 927 days.

(21) Appl. No.: 12/584,735

(22) Filed: Sep. 14, 2009

(65) Prior Publication Data
US 2011/0065510 A1    Mar. 17, 2011

(51) Int. Cl.
*A63F 13/00* (2014.01)

(52) U.S. Cl.
USPC ............................................. 463/38

(58) Field of Classification Search
USPC ............................................. 463/38
See application file for complete search history.

(56) References Cited

U.S. PATENT DOCUMENTS

| | | | |
|---|---|---|---|
| 3,779,583 A * | 12/1973 | Nuber | 285/48 |
| 4,027,359 A * | 6/1977 | Tinker | 24/115 R |
| 5,476,261 A | 12/1995 | Hultstrand | |
| 5,643,087 A | 7/1997 | Marcus et al. | |
| 5,883,690 A | 3/1999 | Meyers et al. | |
| 5,976,018 A | 11/1999 | Druckman | |
| D432,543 S | 10/2000 | Blanc et al. | |
| 6,201,196 B1 | 3/2001 | Wergen | |
| 6,338,485 B1 | 1/2002 | Huettlinger | |
| 6,459,420 B1 * | 10/2002 | Harris | 345/161 |
| 6,557,853 B2 | 5/2003 | Huettlinger | |
| 6,769,689 B1 | 8/2004 | Shimomura et al. | |
| 7,167,159 B2 | 1/2007 | Bailey | |
| D620,535 S | 7/2010 | Thomas | |
| 2005/0124416 A1 | 6/2005 | Hammond et al. | |
| 2005/0195156 A1 | 9/2005 | Pihlaja et al. | |
| 2005/0277470 A1 | 12/2005 | Watanachote | |
| 2008/0153593 A1 | 6/2008 | Ikeda et al. | |
| 2010/0167825 A1 | 7/2010 | Sternberg et al. | |

* cited by examiner

Primary Examiner — Melba Bumgarner
Assistant Examiner — Thomas H Henry

(57) ABSTRACT

Apparatus for controlling gaming analog sticks, comprising an upwardly generally concave thumb support, and attachment means underlying the thumb support for adjustably attaching the support to upper extent of a gaming analog stick.

6 Claims, 4 Drawing Sheets

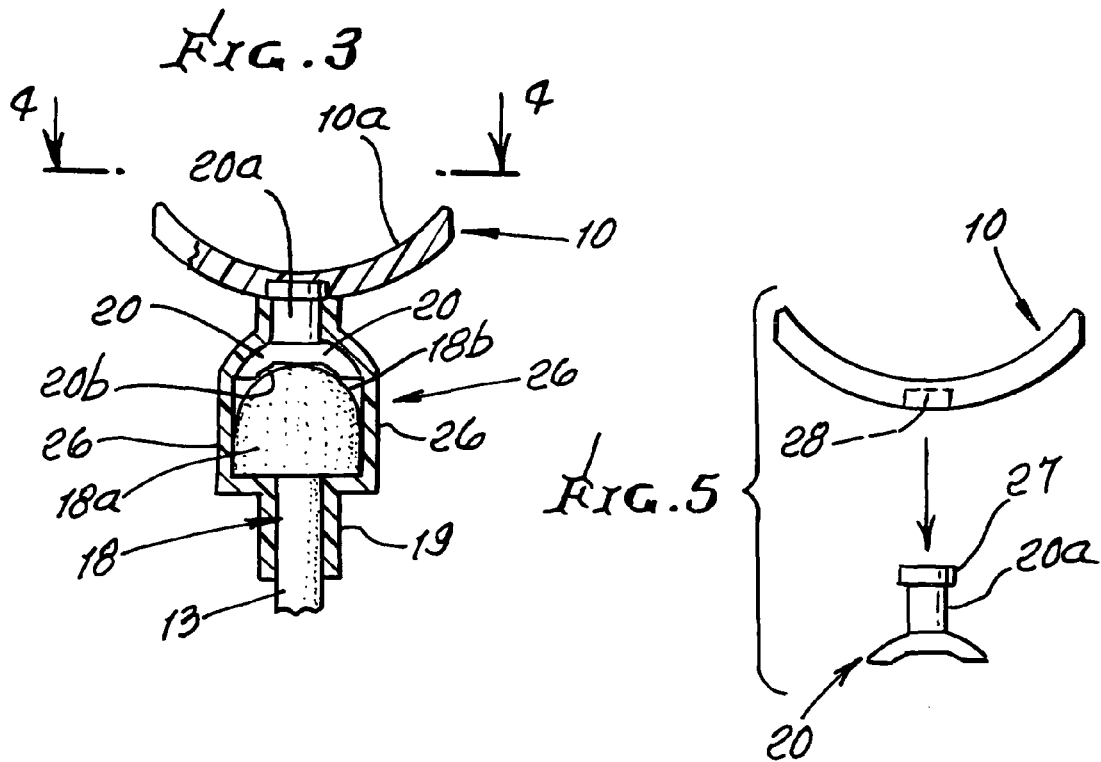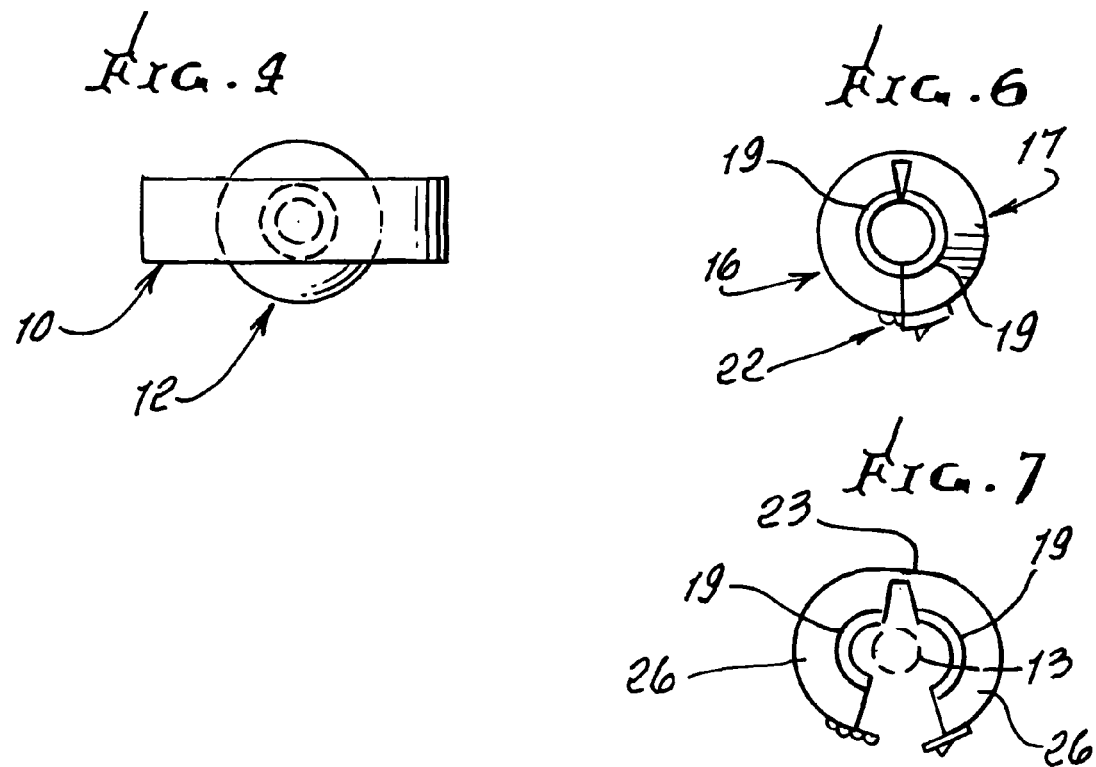

GAME CONTROL THUMB GRIP

BACKGROUND OF THE INVENTION

This invention relates generally to control thumb grips to be controllably pressed by a user's thumb, as the user operates a device such as a gaming apparatus, and more particularly concerns improvements which enhance usefulness of such thumb controlled devices.

At present, existing thumb controls are generally of one-piece construction, which restrict usefulness as respects thumb support and operation. There is need for improvements in such controls which enhance, not restrict, such usefulness. This is especially important, considering that operators of gaming devices typically hand-hold the devices for lengthy time periods, whereby thumb and hand comfort become of great importance.

Also, there is need for improved thumb supports and associated apparatus, having the improvements in structure, functions and results as are disclosed herein.

SUMMARY OF THE INVENTION

It is a major object of the invention to provide improvements in thumb supports, used in gaming apparatus, as disclosed below. Basically, the invention is embodied in improved apparatus that comprises:

a) an upwardly generally concave thumb support, and b) attachment means underlying the thumb support for adjustably attaching the support to upper extent of a gaming analog stick or stem.

As will appear, the attachment means typically includes a split sleeve having sections that are hinge connected together to enable closing together displacement of the sleeve sections, about the analog stick, at least one of said sections operatively connected to said thumb support. A connector typically holds the sleeve sections closed together, to be released for changing the thumb support to be used. The sections may be held tightly against the stem to fit the thumb support relative to the stem, or they may be held in loose relation to the stem to allow swiveling of the thumb support relative to the stem.

Another object includes providing a releasable connector for releasably holding said sleeve sections in closed together condition. This facilitates changing of the thumb support by releasing the attachment means enabling removal of said thumb support, and then selectively attaching the attachment means of another and different configuration thumb support to the analog stick. In this regard, a set of such thumb supports may be provided, with different configurations or appearances, to be individually selectable for clip-on interconnection to the attachment means. Such thumb supports may have differently shaped or sized upper surface curvature, to comfortably fit different user thumb sizes or shapes, enabling lengthy comfortable use of the gaming device, with extended utility. Support concave surfaces may for example have X or W shape, as will appear, to match the make of a particular gaming device.

Yet another object is to provide for selective lateral tilt or off-setting of the thumb support relative to its supporting analog stick. In this regard, the attachment means and thumb support may have clip-on interconnection, and such interconnection may include a laterally projecting holder, and a receiver slit or slot receivable relatively onto the holder. This further facilitates selective application and use of different thumb supports, as will appear.

A typical control thumb grip can be customizable with team, school or company logos and colors, and with selected advertisement/marketing print or design use, for personalization as for a particular person or group. Further, the grip is customizable for different shapes to resemble a certain selected figure or object. For example, a war game device may have a helmet configured as the thumb grip, or the sole of a combat boot. A sport game may have a grip shaped as a football, baseball, or a standing golf club, for maximum control on the golf course. The grips may be mounted in many different shapes and sizes depending on the video game, or company, for which it is customized. The grips may also be customizable for individual names and styles combined with specific colors and patterns.

These and other objects and advantages of the invention, as well as the details of an illustrative embodiment, will be more fully understood from the following specification and drawings, in which:

DRAWING DESCRIPTION

FIG. 3 shows attachment of a thumb support to an existing head of a thumb control;

FIG. 4 is plan view taken on lines 4-4 of FIG. 3;

FIG. 5 is an elevation showing attachment of a thumb support to a positioner;

FIG. 6 is a plan view of closed together sections of attachment means;

FIG. 7 is a view like FIG. 6, showing the sections opened apart;

DRAWING DESCRIPTION

Figure 1:
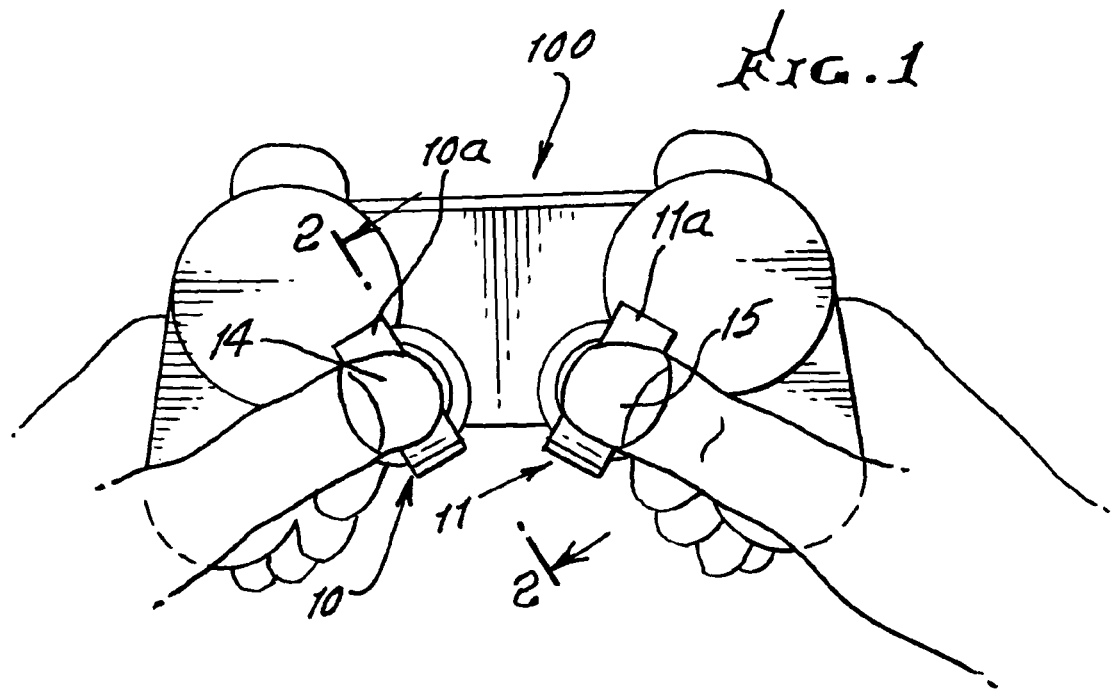
FIG. 1 shows a thumb controlled gaming device having U-shaped thumb supports.
Figure 2:
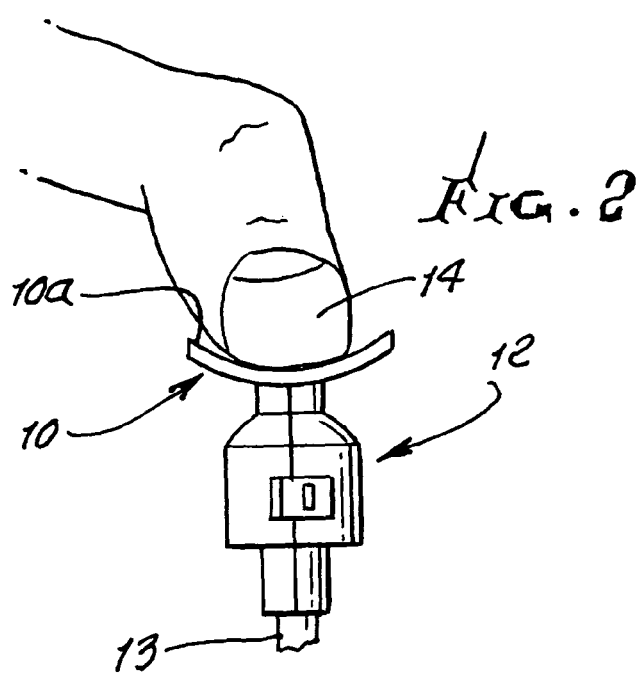
FIG. 2 is a section taken on lines 2-2 of FIG. 1.

In FIGS. 1 and 2, U-shaped thumb supports 10 and 11 are releasably attached, by attachment means 12, to gaming device 100 control sticks 13, and show user's thumbs 14 and 15 downwardly engaged onto the supports 10 and 11. Upwardly concave surfaces 10a and 11a enable thumb angling while still engaging the support or supports, for enhanced control.

FIGS. 3-7 show clip-on attachment of split sections 16 and 17 of the attachment means to an existing gaming stick 18 having a control head 18a. Each section includes an enlarged barrel portion 26 fitting about head 18a, a lower reduced portion 19 fitting about the stick 18, and an upper reduced portion 19a fitting about the stem 20a of a positioner 20. The positioner has a lower seat 20b engaging the top concave surface 18b of the head 18a; and the seat is clamped to the head when the sections 16 and 17 are closed together and interconnected at 22, as seen in FIGS. 3 and 6.

The sections 16 and 17 are hinged together, as by integral living hinge 23, to allow their relative opening as in FIG. 7, for release, of section lower portions 19 from stick 18, release of upper portions 19a from the positioner stem 20a and release of barrel portions 26 from the side of head 18a. Since the positioner is releasably connected to the thumb support 10 (or 11) by stem 20a, the thumb support may also be released, for changing with another like upwardly concave support, which may have a different size or appearance. FIG. 5 shows a tongue 27 and groove 28 interconnection for example frictional, of a thumb support 10 to a positioner 20, whereby the thumb support itself may simply be released and a different support (configuration or appearance) may be substituted.

Figure 9:
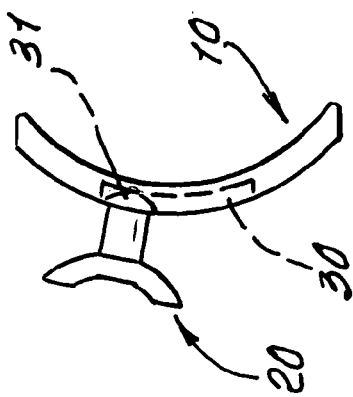
FIGS. 8-10 show different adjustment positions of a positioner relative to a thumb support.
Figure 8:
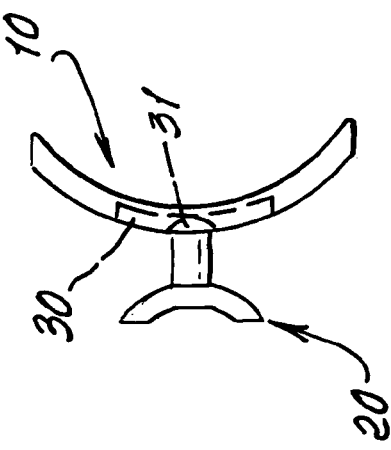
Figure 10:
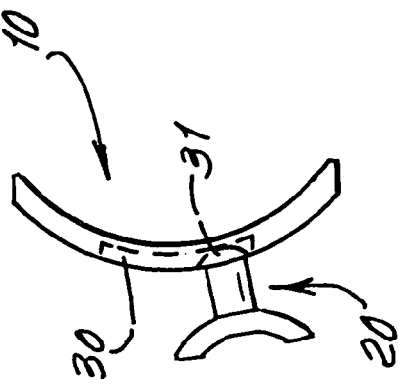

FIGS. 8-10 show lateral sliding interconnection and positions, of thumb support groove 30 to an upstanding tongue 31 of a positioner 20.

Figure 11:
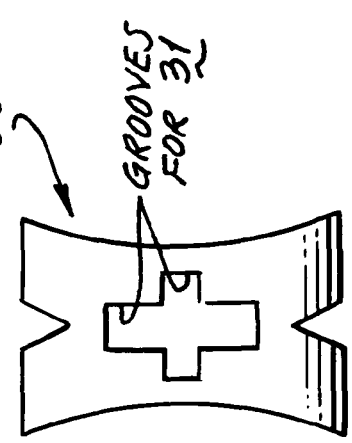
FIGS. 11-13 show different configurations of the thumb support.
Figure 12:
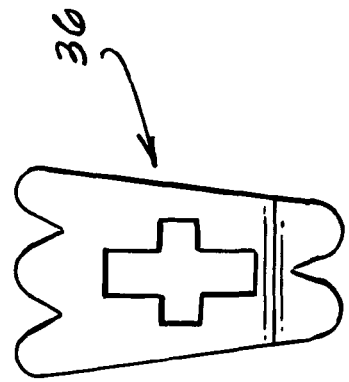
Figure 13:
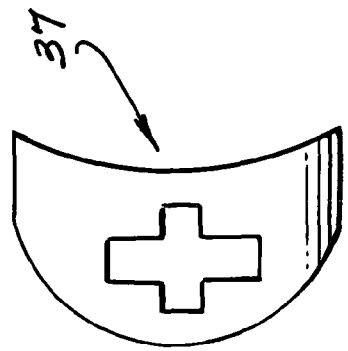

FIGS. 11-13 show different configurations and appearances of thumb supports 35-37, that can be matched to analog sticks of different existing gaming devices (Sony, Microsoft, X-Box, Wii).

Figure 14:
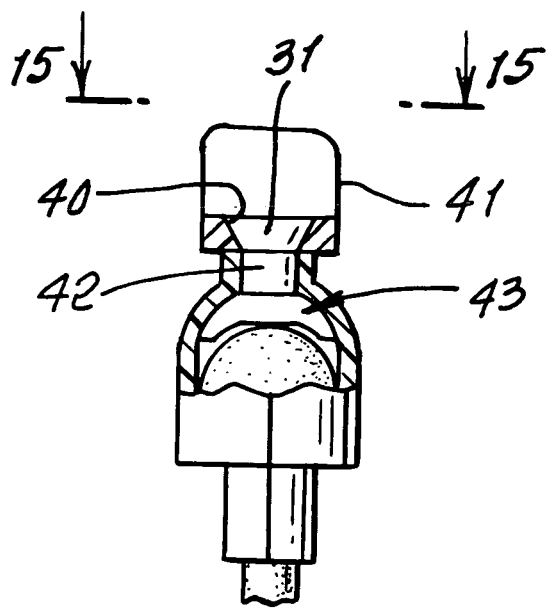
FIG. 14 shows slide groove attachment of a thumb support to a positioner.
Figure 15:
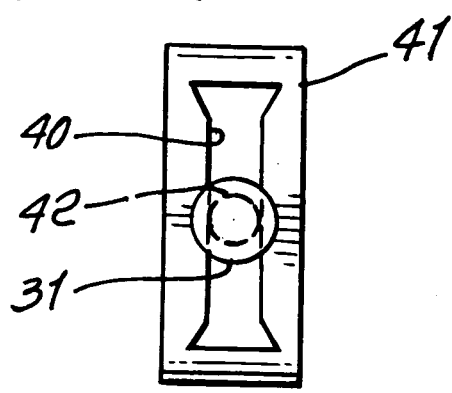
FIG. 15 is a plan view taken on lines 15-15 of FIG. 14.

FIGS. 14 and 15 show a slide-on interconnection of a laterally extending groove 40 defined by a U-shaped thumb support 41, and tongue 31 on stem 42 of a positioner 43. Tongue 31 may also extend laterally to be received laterally in groove 40.

Figure 16:
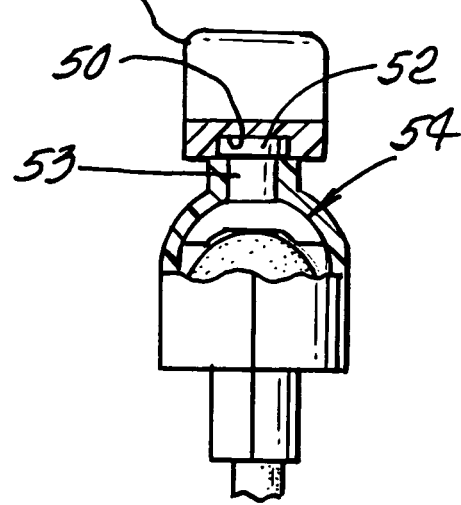
FIGS. 16 and 17 show modifications.
Figure 17:
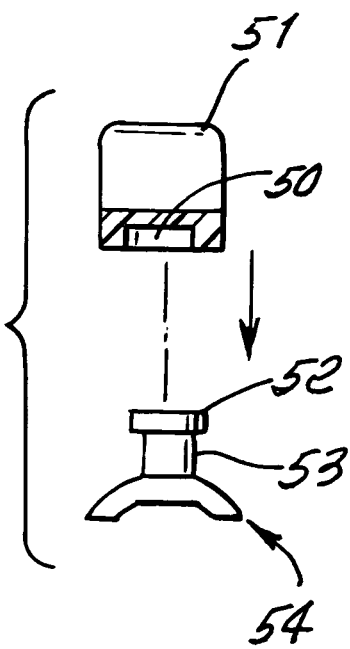

FIG. 16 shows a modified groove 50 in a thumb support 51, and receiving a modified tongue 52 on the stem 53 of a positioner 54, for snap-interconnection of 50 and 52. FIG. 17 shows separation of the snap interconnection.

What is claimed is:

1. In apparatus for controlling gaming device analog sticks, the combination comprising
   a) a thumb support, and
   b) attachment means underlying said thumb support for adjustably attaching said support to upper extent of a gaming analog stick, the attachment means including a split sleeve having sections hinge connected together to enable closing together displacement of the sleeve sections about said analog stick,
   c) said support having an uppermost surface the entirety of which is downwardly U-shaped toward said attachment means,
   d) the thumb support and underlying attachment means having an elongated slide groove attachment extending along U-shaped lowermost curved extent of said thumb support,
   e) said attachment means including an elongated U-shaped groove sunk upwardly in the underside of said support, the groove everywhere spaced downwardly from said support uppermost surface, the attachment means including a support positioner everywhere located below the support uppermost surface and having a tongue in the groove to be slidable in the groove and lengthwise of the groove, whereby the support has variably and selectably tilted positioning relative to the positioner in response to such tongue sliding,
   f) the support having a first tilted position in which it is displaced in one direction to the end of the groove and relative to the positioner and to a displaced extent exceeding a width of the tongue,
   g) the support having a second tilted position in which it is displaced in the opposite direction to the end of the groove and relative to the positioner and to a displaced extent exceeding a width of the tongue.

2. The combination of claim 1 including said gaming analog stick to which said attachment means is adjustably attached.

3. The combination of claim 2 including gaming apparatus associated with said analog stick.

4. The combination of claim 3 wherein said means includes a split sleeve having sections hinge connected together to enable closing together displacement of the sleeve sections, said attachment closable about the positioner.

5. The combination of claim 1 wherein at least one of said sections is operatively connected to said thumb support, at least another of the sections being free of any integral connection to the support, and being movable relative to the support to enable said closing together displacement.

6. The combination of claim 5 including a releasable connector for releasably holding said sleeve sections in closed together condition.

* * * * *